DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1163

T880,010

OVENS

Laurence Michael Smith, Welwyn Garden City, England, assignor to Imperial Chemical Industries Limited, Millbank, London, England, a corporation of Great Britain

Filed Feb. 6, 1970, Ser. No. 9,453

Claims priority, application Great Britain, Feb. 14, 1969, 8,173/69

Int. Cl. B32f *23/08;* D21h *1/40*

U.S. Cl. 117—155

No Drawing. 7 Pages Specification

A disposable liner for an oven comprising paper board coated with the polymer 4-methyl pentene-1 is disclosed. During the course of normal cooking and roasting in an oven, particularly an electric oven, grease and other splashings are deposited on the inside surface of the oven. Homopolymers of 4-methyl pentene-1 or a copolymer of 4-methyl pentene-1 with one or more $\alpha$-olefins can be used, polymers of 4-methyl pentene-1 have a melting point of about 464° F. in excess of normal oven temperatures, and are inert to hot fat and splashings.

A thin coating, for instance about 0.001 inch thick, is placed over a fiber board about 0.018 inch thick capable of withstanding temperatures up to 500° F. and supporting the polymer coating. A liner of this thickness can be readily deformed to fit the interior of the oven walls and shelves. In use, the liner collects most of the greasy deposit otherwise deposited on the interior surfaces of the oven. The liner is easily removed, discarded and replaced when greasy or dirty.